United States Patent [19]
Scales

[11] Patent Number: 6,078,940
[45] Date of Patent: Jun. 20, 2000

[54] MICROPROCESSOR WITH AN INSTRUCTION FOR MULTIPLY AND LEFT SHIFT WITH SATURATE

[75] Inventor: Richard H. Scales, Nice, France

[73] Assignee: Texas Instruments Incorporated, Dallas, Tex.

[21] Appl. No.: 09/012,380

[22] Filed: Jan. 23, 1998

Related U.S. Application Data

[60] Provisional application No. 60/036,397, Jan. 24, 1997.

[51] Int. Cl.[7] ....................................................... G06F 7/52
[52] U.S. Cl. ............................................................. 708/552
[58] Field of Search ..................................... 708/552, 553, 708/498

[56] References Cited

U.S. PATENT DOCUMENTS

| | | | |
|---|---|---|---|
| 5,539,685 | 7/1996 | Otaguro | 708/552 |
| 5,847,978 | 12/1998 | Ogura et al. | 708/552 |
| 5,915,109 | 6/1999 | Nakakimura et al. | 708/552 |
| 5,917,740 | 6/1999 | Volkonsky | 708/552 |

*Primary Examiner*—David H. Malzahn
*Attorney, Agent, or Firm*—Gerald E. Laws; Robert D. Marshall, Jr.; Frederick J. Telecky, Jr.

[57] ABSTRACT

A microprocessor 1 has an instruction fetch/decode unit 10*a–c*, a plurality of execution units, including an arithmetic and load/store unit D1, a multiplier M1, an ALU/shifter unit S1, an arithmetic logic unit ("ALU") L1, a shared multiport register file 20*a* from which data are read and to which data are written, and a memory 22. Execution unit M1 has circuitry for multiplying two operands, shifting the resulting product and saturating the product if an overflow is detected in two execution phase of an instruction execution pipeline.

15 Claims, 7 Drawing Sheets

FIG. 3A

| Pipeline Phase | Symbol | During this Entire Phase | By the End of This Phase |
|---|---|---|---|
| Program Address Generate | PG | | ▫ Except when a program store is in E1, PFC and PADDR and latched to their next values: either the next 8-word boundary after the current PFC or a branch target address.<br>▫ When a program store is in E1, the PFC remains unchanged and PADDR takes the value from the program store instruction. |
| Program Address Send | PS | ▫ PFC valid on PADDR.<br>▫ If a fetch packet fetch needed, PRS set active. | ▫ If PRS active, PMS latches PADDR. |
| Program Wait | PW | ▫ If the fetch packet indicated by the last PRS is necessary, PDS is asserted. | ▫ If PDS is asserted, PMS latches the last requested fetch packet to be driven during PR. |
| Program Data Receive | PR | ▫ If PDS active during the associated PW, PMS drives requested fetch packet onto PDATA_1. Otherwise the previous fetch packet driven on to PDATA_1 is maintained. | ▫ If it can be determined that the fetch packet requested by an active PDS in PW is needed, CPU latches this fetch packet on PDATA_1. Otherwise, this latch maintains state. |
| Dispatch | DP | | ▫ Parallelism of the fetch packet detected.<br>▫ Instructions in the next requested execute packet in the fetch packet dispatched to the appropriate functional units.<br>▫ Detection of the software breakpoint code in the CREG field detected.<br>▫ Multi-cycle NOP, NOP, SWI, and IDLE decoded because they are not passed to individual functional units.<br>▫ PC of the execute packet in DP latched at the end of the cycle as PCDC. |
| Decode | DC | ▫ PCDC valid. | ▫ Control signals for actions during execute decoded. |

FIG. 3B

| Pipeline Phase | Symbol | During this Phase | By the End of This Phase | CPU has Completed Types |
|---|---|---|---|---|
| Execute 1 | E1 | ▫ All Types: Registers read. | ▫ Type ISS: Results written to the register file.<br>▫ Type ISS: Status written to the control register file.<br>▫ Type LD and ST: Address modifications written to the register file.<br>▫ Type LD and ST: DADDR, DBS, and DRNW latched for next phase.<br>▫ Type ST: DDATA_0 latched for next phase.<br>▫ Type BRANCH: PFC and PADDR latches the target address.<br>▫ Type STP: PADDR latches the destination address if no fetch is pending. PWS latched as active for next phase.<br>▫ Types LD, ST, STP, IMPY: Intermediate states latched. | ▫ ISC.<br>▫ BR. |
| Execute 2 | E2 | ▫ Types LD and ST: DBS active and DADDR valid.<br>▫ Type LD: DRNW active.<br>▫ Type ST: DRNW inactive and DDATA_0 valid. | ▫ Type IMPY: Results written to the register file.³<br>▫ Type IMPY: Status written to the control register file.<br>▫ Types LD and ST: DMS latches ADDR.<br>▫ Type ST: DMS latches DDATA_0.<br>▫ Type STP: PMS latches PDATA_0.<br>▫ Type LD: Intermediate states latched. | ▫ IMPY.<br>▫ STD.<br>▫ STP. |
| Execute 3 | E3 | | ▫ Type LD: DMS latches data requested during the last cycle.<br>▫ Types LD: Intermediate states latched. | |
| Execute 4 | E4 | ▫ Type LD: DMS drives on DDATA_1 data requested during associated E2. | ▫ Type LD: DDATA_1 latched.<br>▫ Types LD: Intermediate states latched. | |
| Execute 5 | E5 | | ▫ Type LD: DDATA_1 right-aligned, either sign-extended or zero-filled, and written to the register file. | ▫ LD. |

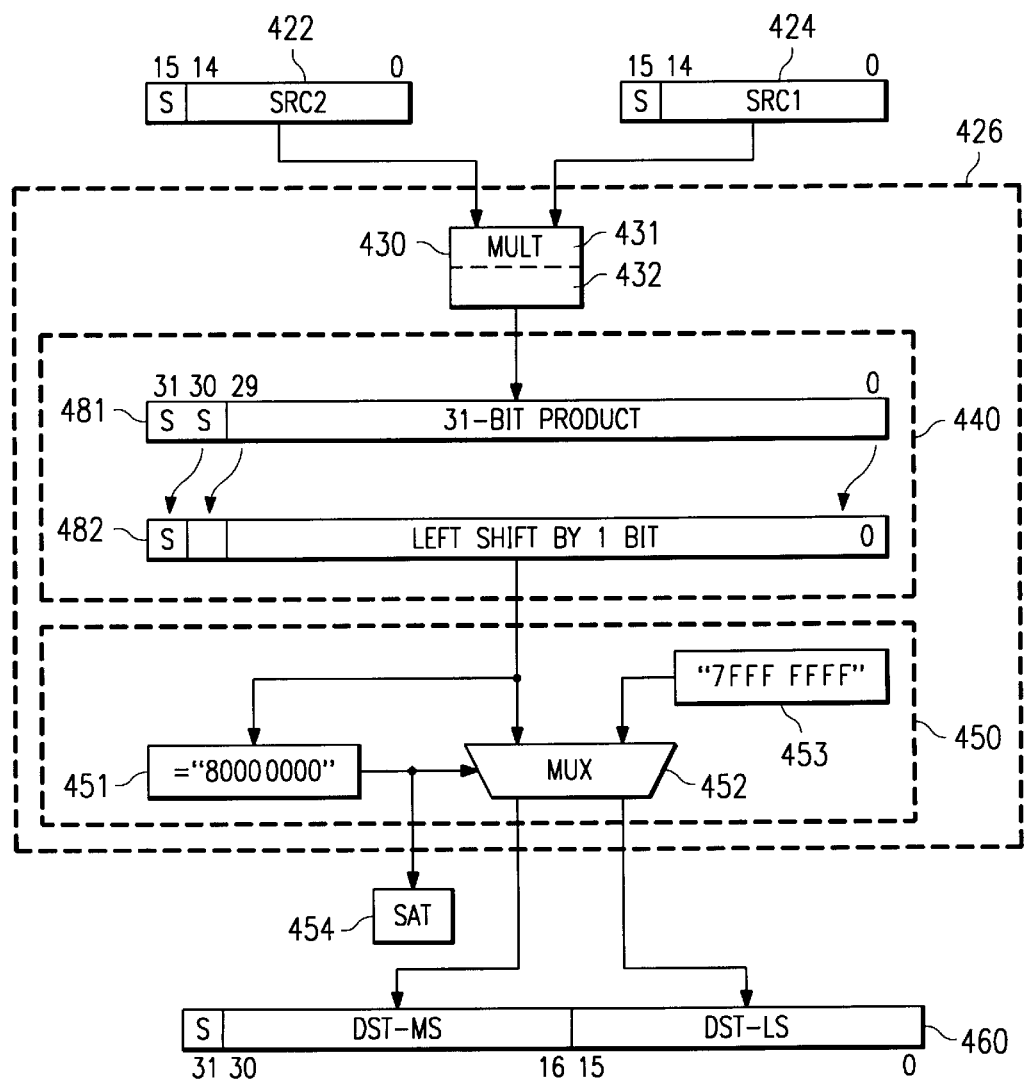

Syntax  SMPY (.unit) src1, src2, dst

.unit = .M1 or .M2

| Opcode Map Fields | Unit | Operands | Opcode | Mnemonic |
|---|---|---|---|---|
| src1<br>src2<br>dst | .M1, .M2 | slsb16<br>xslsb15<br>sint | 11010 | SMPY |
| src1<br>src2<br>dst | .M1, .M2 | smsb16<br>xslsb16<br>sint | 01010 | SMPYHL |
| src1<br>src2<br>dst | .M1, .M2 | slsb16<br>xsmsb16<br>sint | 10010 | SMPYLH |
| src1<br>src2<br>dst | .M1, .M2 | smsb16<br>xsmsb16<br>sint | 00010 | SMPYH |

6,078,940

MICROPROCESSOR WITH AN INSTRUCTION FOR MULTIPLY AND LEFT SHIFT WITH SATURATE

This application claims priority under 35 USC §119(e)(1) of Provisional Application Ser. No. 60/036,397, filed Jan. 24, 1997.

CROSS REFERENCE TO RELATED APPLICATIONS

This application is related to coassigned application Ser. No. 09/012,813 (TI-25311), filed Jan. 23, 1998, filed contemporaneously herewith and incorporated herein by reference.

TECHNICAL FIELD OF THE INVENTION

This invention relates to microprocessors, and particularly relates to Digital Signal Processors.

BACKGROUND OF THE INVENTION

Microprocessor designers have increasingly endeavored to improve performance in various microprocessors by increasing clock speeds and adding parallelism. Complex data manipulations require execution of a number of instructions, which may require many cycles for various types of data manipulations. Some microprocessors contain special instructions for specific types of data manipulations, but these generally require a number of microcode cycles for execution.

An object of the present invention is to improve the performance of a microprocessor for digital signal processing applications, such as vocoder algorithms.

SUMMARY OF THE INVENTION

In general, and in a form of the present invention, a data processing device is provided which has a central processing device for executing a multiply-shift-saturate instruction which multiplies a first signed source operand by a second signed source operand, normalizes a result, and saturates the result if an overflow is detected. The device has source circuitry operable to hold the first signed source operand and the second signed source operand which is provided to multiply circuitry which multiplies the first source operand by the second source operand and forms a result which conforms to a signed number representation scheme. Shift circuitry shifts the result a predetermined number of bits to normalize the result. Saturation circuitry forms a destination operand by setting all bits in the destination operand to a predetermined value if the shifted result incorrectly represents the result according to the signed number representation scheme.

In another form of the present invention, a method for operating a data processing device comprises the steps of: providing the first signed source operand and the second signed source operand; multiplying the first signed source operand by the second signed source operand to form a signed result; normalizing the signed result by shifting a predetermined number of bits according a signed number representation scheme; and forming a destination operand by setting all bits in the destination operand to a predetermined value if the shifted result incorrectly represents the normalized result according to the signed number representation scheme.

Other embodiments of the present invention will be evident from the description and drawings.

BRIEF DESCRIPTION OF THE DRAWINGS

Other features and advantages of the present invention will become apparent by reference to the following detailed description when considered in conjunction with the accompanying drawings, in which:

FIG. 3A is a chart which illustrates the processing phases of an instruction execution pipeline in the microprocessor of FIG. 1;

FIG. 3B is a chart which illustrates the execution phases of the instruction execution pipeline in the microprocessor of FIG. 1;

FIG. 5 is a representation of an opcode for a multiply instruction according to the present invention;

FIG. 6 is a block diagram of circuitry to execute the multiply instruction of FIG. 5;

Corresponding numerals and symbols in the different figures and tables refer to corresponding parts unless otherwise indicated.

DETAILED DESCRIPTION OF EMBODIMENTS OF THE INVENTION

Figure 1:
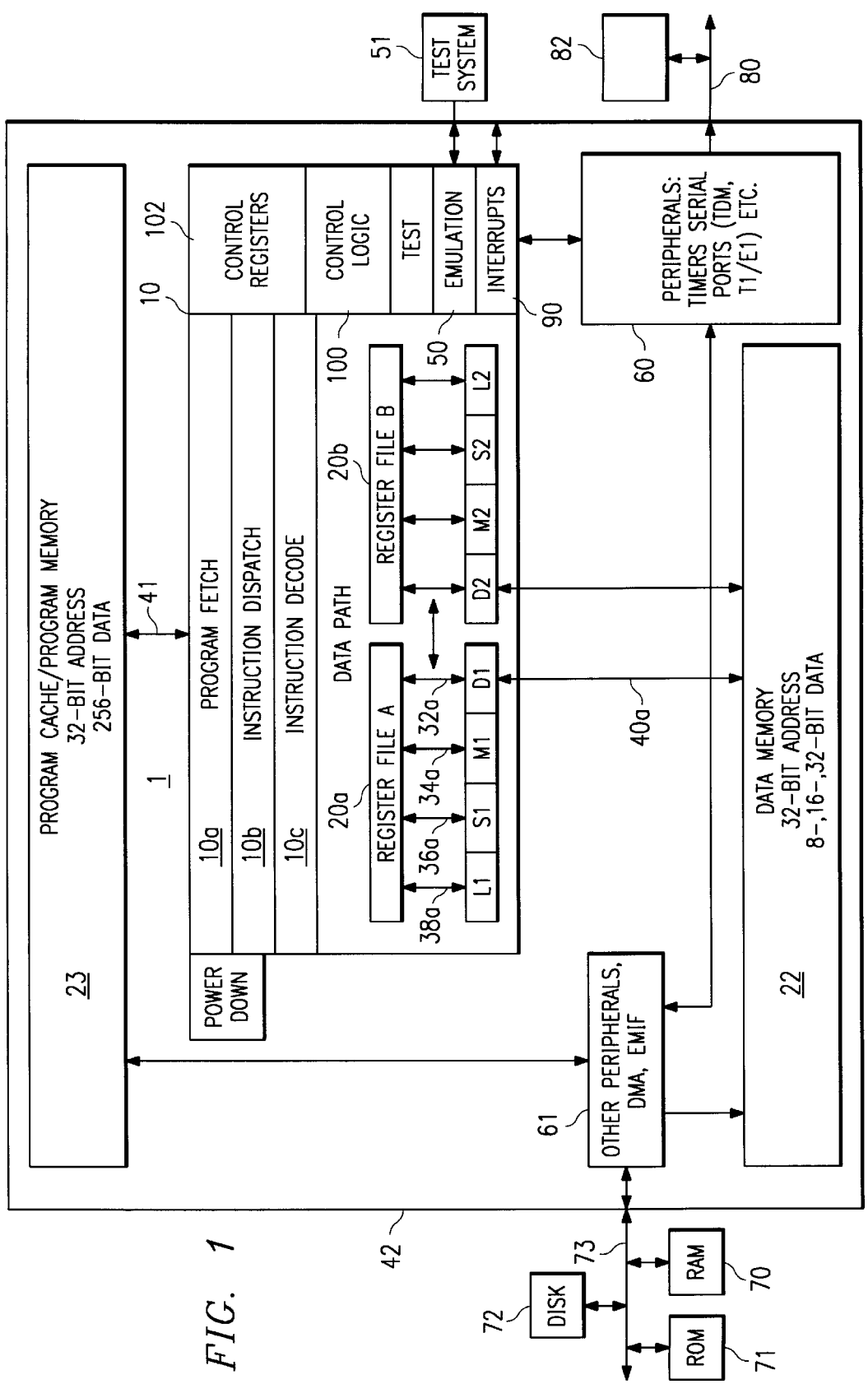
FIG. 1 is a block diagram of a digital signal processor (DSP) which embodies the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multiport register file 20a from which data are read and to which data are written. Decoded instructions are provided from the instruction fetch/decode unit 10a–c to the functional units D1, M1, S1, and L1 over various sets of control lines which are not shown. Data are provided to/from the register file 20a from/to to load/store units D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store units D1 via a fifth set of busses 40a. Note that the entire data path described above is duplicated with register file 20b and execution units D2, M2, S2, and L2. Instructions are fetched by fetch unit 10a from instruction memory 23 over a set of busses 41. Emulation unit 50 provides access to the internal operation of integrated circuit 1 which can be controlled by an external test system 51.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. Also, an alternate number of execution units can be used.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller is generally used to move data between memory and peripherals within microprocessor 1 and memory and peripherals which are external to microprocessor 1.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features of the microprocessor of FIG. 1 is provided in coassigned application Ser. No. 09/012,813 (TI-25311), filed Jan. 23, 1998. A description of a complete set of instructions for the microprocessor of FIG. 1 is also provided in coassigned application Ser. No. 09/012,813 (TI-25311), filed Jan. 23, 1998.

Figure 2:
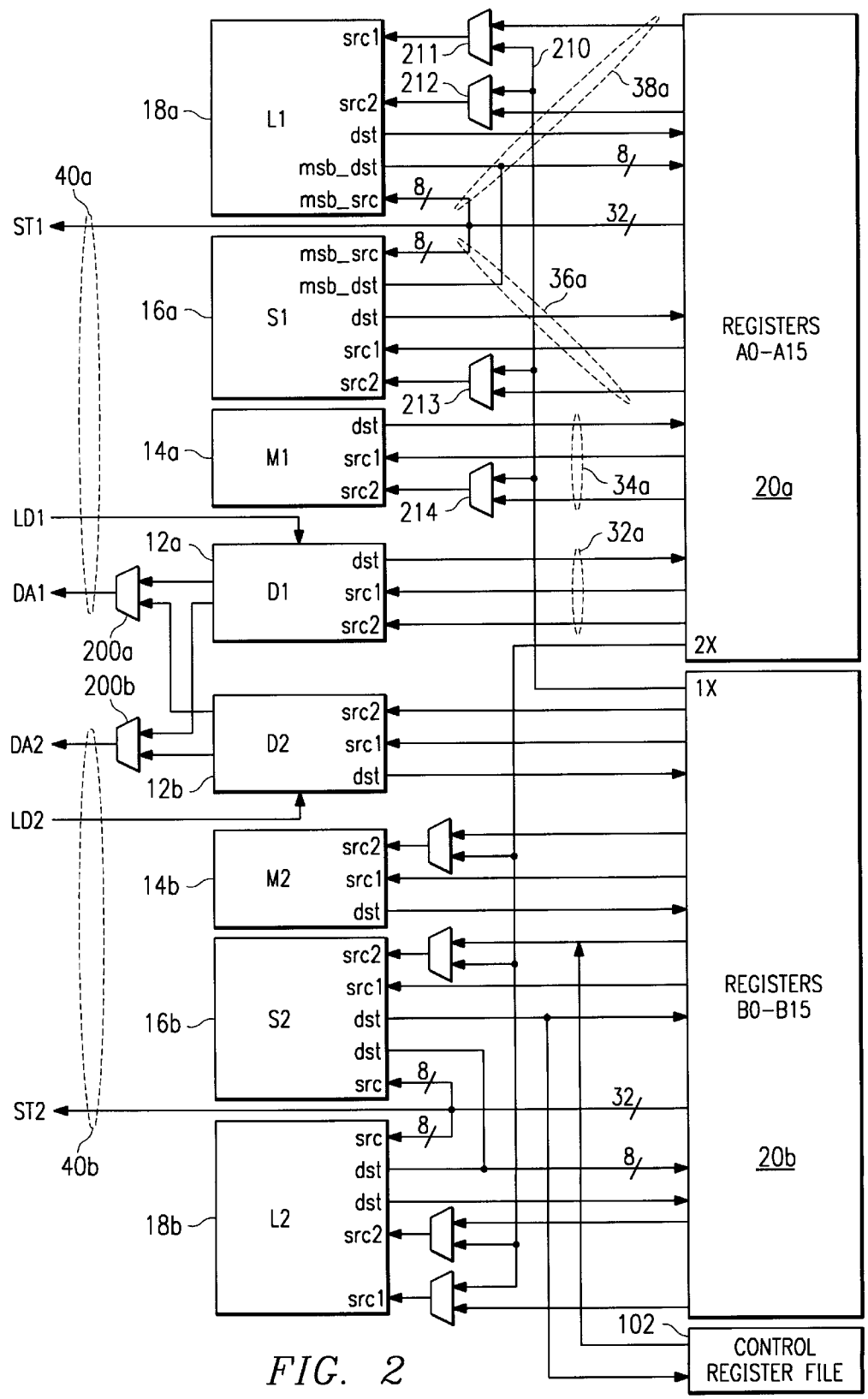
FIG. 2 is a more detailed block diagram of the DSP of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. Bus 40a has an address bus DA1 which is driven by mux 200a. This allows an address generated by either load/store unit D1 or D2 to provide an address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1, with the assistance of mux 200b for selecting an address.

ALU unit L1 performs the following types of operations: 32/40 bit arithmetic and compare operations; left most 1, 0, bit counting for 32 bits; normalization count for 32 and 40 bits; and logical operations. ALU L1 has input src1 for a 32 bit source operand and input src2 for a second 32 bit source operand. Input msb_src is an 8 bit value used to form 40 bit source operands. ALU L1 has an output dst for a 32 bit destination operands. Output msb_dst is an 8 bit value used to form 40 bit destination operands. Two 32 bit registers in register file 20a are concatenated to hold a 40 bit operand. Mux 211 is connected to input src1 and allows a 32 bit operand to be obtained from register file 20a via bus 38a or from register file 20b via bus 210. Mux 212 is connected to input src2 and allows a 32 bit operand to be obtained from register file 20a via bus 38a or from register file 20b via bus 210. ALU unit L2 operates similarly to unit L1.

ALU/shifter unit S1 performs the following types of operations: 32 bit arithmetic operations; 32/40 bit shifts and 32 bit bit-field operations; 32 bit logical operations; branching; and constant generation. ALU S1 has input src1 for a 32 bit source operand and input src2 for a second 32 bit source operand. Input msb_src is an 8 bit value used to form 40 bit source operands. ALU S1 has an output dst for a 32 bit destination operands. Output msb_dst is an 8 bit value used to form 40 bit destination operands. Mux 213 is connected to input src2 and allows a 32 bit operand to be obtained from register file 20a via bus 36a or from register file 20b via bus 210. ALU unit S2 operates similarly to unit S1, but can additionally perform register transfers to/from the control register file 102.

Multiplier M1 performs 16×16 multiplies. Multiplier M1 has input src1 for a 32 bit source operand and input src2 for a 32 bit source operand. ALU S1 has an output dst for a 32 bit destination operands. Mux 214 is connected to input src2 and allows a 32 bit operand to be obtained from register file 20a via bus 34a or from register file 20b via bus 210. Multiplier M2 operates similarly to multiplier M1.

FIG. 3A is a chart which illustrates the processing phases of an instruction execution pipeline in the microprocessor of FIG. 1. Each phase corresponds roughly to a clock cycle of a system clock. For example, if microprocessor 1 is being operated at 200 MHz, then each phase is nominally 5 Ns. However, in a phase where data is expected from a memory or peripheral, such as RAM 70, the pipeline will stall if the data is not ready when expected. When stalled, a given pipeline phase will exist for a number of system clock cycles.

In FIG. 3A, the first phase of processing an instruction is to generate the program address in phase PG. This is done by loading a program fetch counter PFC which is located in control register file 102. During the second instruction processing phase PS, an address of an instruction fetch packet is sent to program memory 23 via a program address bus PADDR which is part of bus 41. The third phase PW is a wait phase to allow for access time in memory 23. During the fourth phase PR, a program fetch packet is available from program memory 23 via data bus PDATA_I which is part of bus 41. During the fifth processing phase DP, instruction parallelism is detected and instructions that can be executed are dispatched to the appropriate functional units. This aspect of pipeline operation will be described in more detail in later paragraphs. During the sixth processing phase DC, executable instructions are decoded and control signals are generated to control the various data paths and functional units.

FIG. 3B is a chart which illustrates the execution phases of the instruction execution pipeline in the microprocessor of FIG. 1. During the first execution phase E1, single cycle instructions, referred to as "ISC", and branch instructions, referred to as "BR", are completed. A designated execution unit performs the operations indicated in FIG. 3B as directed by control circuitry 100. During the second execution phase E2, the following types of instructions are completed by designated execution units under control of control circuitry 100: integer multiply (IMPY), program store instructions (STP), and data store instructions (STD). During the third execution phase E3, execution of load data instructions (LD) continues by latching data from the data memory system (DMS), as indicated. During execution phase E4, the data latched in E3 is transferred to a data input register DDATA_I in execution unit D1 or D2. During execution phase E5, the LD instruction is completed by manipulating the data in register DDATA_I and writing the manipulated data to a specified register in register file 20a or 20b.

Figure 4:
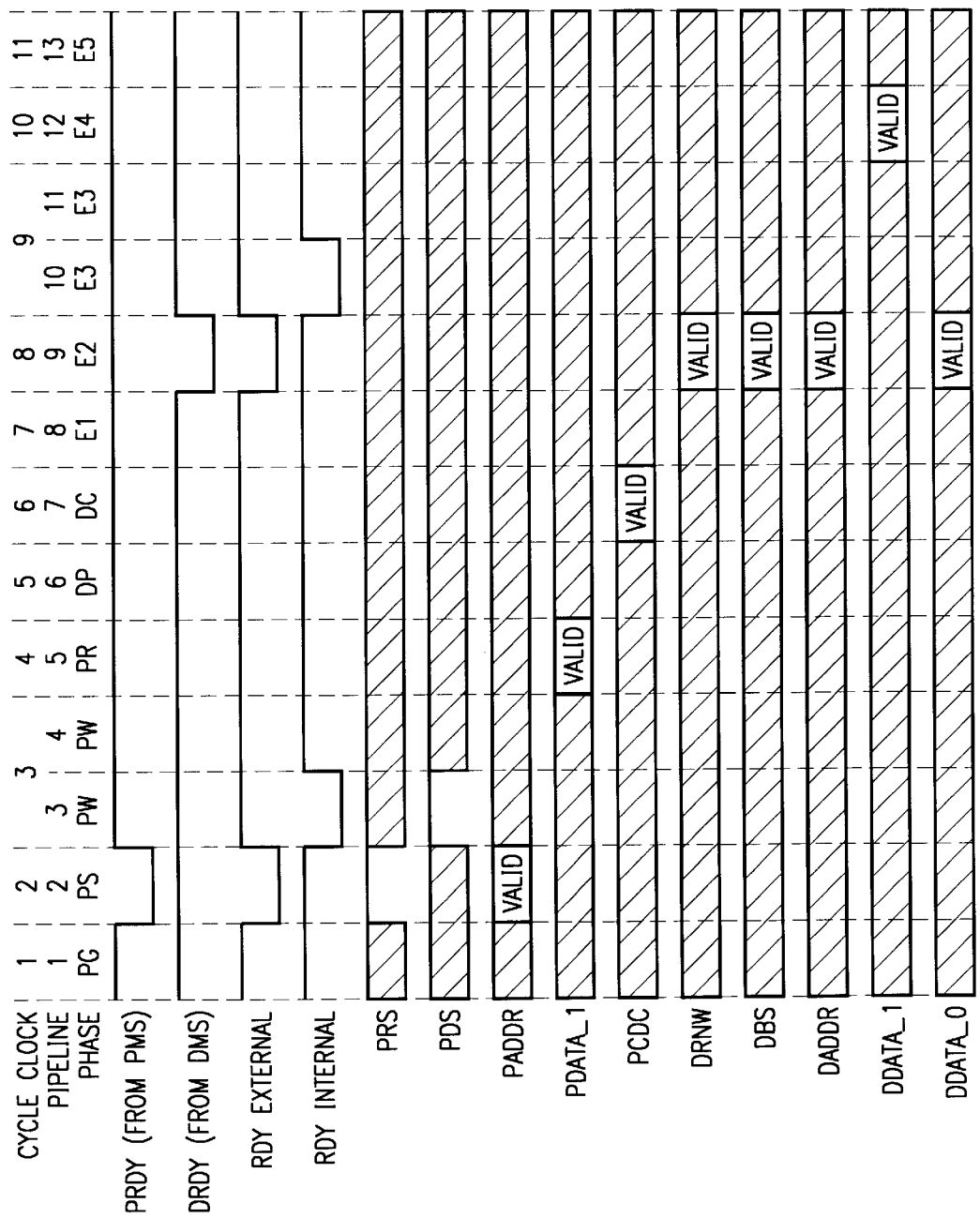
FIG. 4 is a timing diagram which illustrates timing details of processing an instruction fetch packet during the processing phases of FIG. 3A and execution of the execution packet during the execution phases of FIG. 3B.

FIG. 4 is a timing diagram which illustrates timing details of processing an instruction fetch packet during the processing phases of FIG. 3A and execution of the execution packet during the execution phases of FIG. 3B. Note that a pipe stall is illustrated in phase PW due to a program memory ready signal PRDY being low in phase PS, and a second pipe stall in phase E3 due a data memory ready signal DRDY being low in phase E2.

FIG. 5 illustrates an opcode form for a multiply instruction for the microprocessor of FIG. 1. FIG. 5 shows a form of the instruction in which a destination field dst specifies a destination register in register file 20a which receives the result operand of the instruction. A source field src1 specifies a register in register file 20a which holds a source operand which is a multiplier. The least significant 16 bits of this register are used as the multiplier operand. A source field src2 specifies a register in register file 20a which holds a second source operand which is a multiplicand. If field "x" is set to one, then field src2 specifies a register from register file 20b. The least significant 16 bits of this register are used as the multiplicand operand. Bit "m" specifies execution unit M1 is to be used when m=0, and execution unit M2 is to be used when m=1.

A commonly used number format is referred to as Q15 notation. In this number representation scheme, a decimal point is implied to exist between bits 14 and 15 in a 16-bit operand, and bit 15 is a sign bit. Therefore, the number is always a positive or negative fractional number. The largest positive number is 7FFFh (hexadecimal representation), and the largest negative number is 8000h. When two Q15 numbers are multiplied together, a Q30 product is formed. Typically, only the most significant half of the product is used for further computations, so the product is shifted left one bit so the most significant 16-bits of the product conform to Q15 notation.

It has been determined that when 8000h is multiplied by 8000h, the result after shifting is 8000 0000h, which incorrectly indicates that the product of two negative numbers is negative. To correct this anomaly, the product is forced to be 7FFF FFFFh, which is the largest positive number in Q31 notation, and a status bit is set which indicates that the product is a saturated number. A saturated number indicates that the operand is too large to be represented correctly. An operand can be a saturated positive number, such as 7FFFh in Q15 notation, or a saturated negative number, 8000h.

FIG. 6 is a block diagram of circuitry to execute the multiply instruction of FIG. 5. Source circuitry 424 holds the first source operand specified by the instruction format of FIG. 5. Source circuitry 422 holds a second source operand specified by the instruction. Multiply circuitry 430 multiplies the two 16-bit operands together to form a 32-bit product. Multiplier 430 treats both source operands as signed integers and forms a signed integer product. Shift circuitry 440 shifts the product one bit position left in order to format the product for Q15 notation. If the shifted product is 8000 0000h, which incorrectly represents the results of the multiply operation, saturation circuitry 450 forms a destination operand by loading "7FFF FFFF" into destination circuitry 460 to indicate the destination operand is saturated. Otherwise, destination circuitry 460 is loaded with the shifted product. Saturation detection circuitry 451 compares the shifted product to 8000 0000h, and constant circuitry 453 provides a value representing 7FFF FFFFh. Mux 451 is controlled by detector 451 and provides the appropriate destination operand to destination operand circuitry 460. Status circuitry 454 is also set to indicate saturation when a saturated condition is detected by detection circuitry 451.

The circuitry of FIG. 6 is contained within execution units M1 and M2 of CPU 10. As indicated with reference to FIG. 3B, the circuitry of FIG. 6 advantageously allows a multiply-shift-saturate instruction to be executed in two execution phases, phase E1 and E2, of the instruction execution pipeline of CPU 10. As shown in FIG. 3B, an intermediate state of multiply circuitry 430 is latched at the end of E1 so that the time duration of each pipeline phase can be minimized. Thus, multiply circuitry 430 has two separate portions of circuitry: a first portion 431 is active in phase E1 and a second portion 432 is active in phase E2.

In another embodiment of the circuitry of FIG. 6, a multiply-shift-saturate instruction is advantageously executed in only one phase of an instruction execution pipeline by not latching an intermediate state but by lengthening the time of an execution phase so that the entire circuit of FIG. 6 can be traversed in one execution phase. In this embodiment, multiplier 430 is not divided into two portions.

Figures 7, 8:
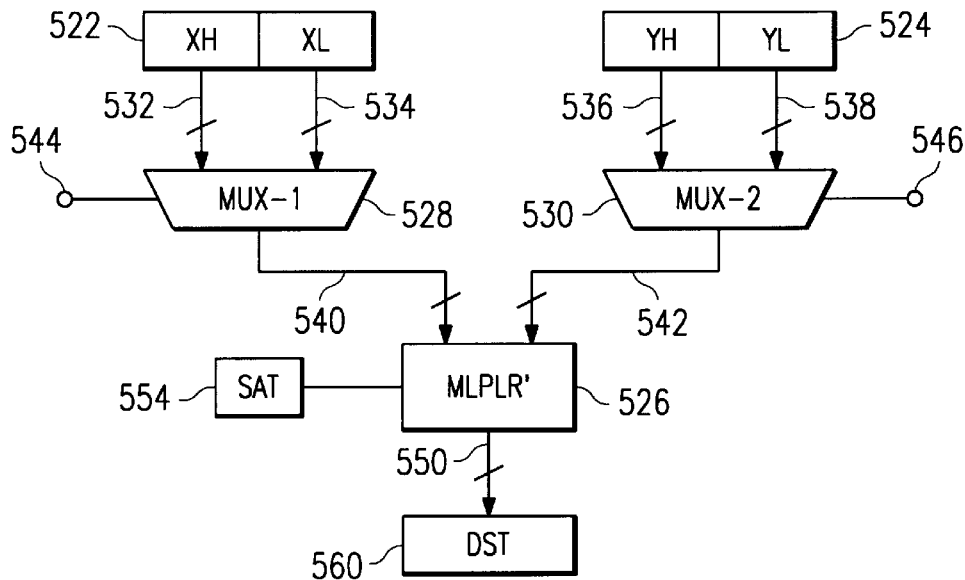
FIG. 7 is a block diagram of a multiplier circuit according to the present invention which can select an upper or lower portion of a source operand.
FIG. 8 is a representation of a set of opcodes for the multiplier of FIG. 7.

In another embodiment, circuitry is provided to allow a 16 bit operand to be selected from either the most significant or the least significant half of a source operand. In FIG. 7, X REG 522 and Y REG 524 are each thirty-two bits wide and serve to provide two source operands, similar to registers 422 and 424 of FIG. 6. These registers are divided into a high half and a low half, each sixteen bits wide. The high half of X REG 522 is designated XH, while the low half of X REG 522 is designated XL, as shown. Similarly, the high half of Y REG 524 is designated YH, while the low half of Y REG 524 is designated YL, as shown. The high half of these registers store the sixteen most significant bits ("MSBs") of the contents of the register, while the low half stores the sixteen least significant bits ("LSBs") of the contents of the register.

The content of each of these half registers XH, XL, YH, YL, is separately available for data transfer to a multiplier, MLPLR 526 through one of two multiplexers, MUX-1 528 or MUX-2 530, each having two data inputs, 532, 534, and 536, 538, respectively, one output 540 and 542, respectively, and a select input 544, 546, respectively. Thus, depending on whether the signal on select input 544 is a "1" or a "0", either XH or XL is selected, on input 532 or input 534, respectively, by MUX-1 528 and provided on the output 540 of MUX-1 528 to be used as one operand for a multiply operation by multiplier 526. Similarly, depending on whether the signal on select input 546 is a "1" or a "0", either YH or YL is selected, on input 536 or input 538, respectively, by MUX-2 530 and provided on the output 542 of MUX-2 530 to be used as the other operand for a multiply operation by multiplier 526. Multiplier 526 includes left shift circuitry and saturate circuitry according to the present invention, similar to multiplier 426 of FIG. 6. Destination circuitry 560 receives the shifted product, while saturate status circuitry 554 is set if a saturated condition is detected by detection circuitry within multiplier 526.

FIG. 8 is a representation of a set of opcodes for the multiplier of FIG. 7. The five bit opcode field is used in the instruction format of FIG. 5. Decode circuitry 10c decodes the opcode field and generates control signals which are provided to select terminals 544 and 546. The terminology used for the operands is as follows: slsb16 is a signed 16-bit integer from the least significant half of the specified register, smsb16 is a signed 16-bit integer from the most significant half of the specified register. "X" indicates that the second operand can be specified to be in an alternate register file, as discussed with reference to FIG. 2.

An alternative embodiment of the novel aspects of the present invention may include other circuitry's which are combined with the circuitry's disclosed herein in order to reduce the total gate count of the combined circuitry. Since those skilled in the art are aware of techniques for gate minimization, the details of such an embodiment will not be described herein.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A data processing device for executing a multiply-shift-saturate instruction which multiplies a first signed source operand by a second signed source operand, normalizes a result, and saturates the result if an overflow is detected, comprising:

source circuitry operable to hold said first signed source operand and said second signed source operand;

multiply circuitry operable to multiply said first source operand by said second source operand operable to form said result conforming to a signed number representation scheme;

shift circuitry operable to shift said result a predetermined number of bits;

saturation circuitry operable to form a destination operand by setting all bits in said destination operand to a predetermined value if said shifted result incorrectly represents said result according to said signed number representation scheme; and destination circuitry operable to hold said destination operand.

2. The data processing device of claim 1, further comprising status circuitry which is responsive to said saturation circuitry to hold a status bit which indicates that said shifted result incorrectly represents said result according to said signed number representation scheme.

3. The data processing device of claim 2, wherein said saturation circuitry further comprises:

detection circuitry operable to determine if said shifted result is equal to a most negative signed number of said signed number representation scheme; and setting circuitry operable to provide said predetermined number to said destination circuitry in response to said detection circuitry.

4. The data processing device of claim 3, wherein:

said setting circuitry is operable to provide said first predetermined number representative of a most positive number if said shifted result is equal to said most negative signed number; and said setting circuitry is operable to provide said shifted result to said destination circuitry if said shifted result is not equal to said most negative signed number.

5. The data processing device of claim 4, wherein said shift circuitry is operable to shift said result one bit left.

6. A data processing device for executing a multiply-shift-saturate instruction which multiplies a first signed source operand by a second signed source operand, normalizes a result, and saturates the result if an overflow is detected, comprising:

source circuitry operable to hold said first signed source operand and said second signed source operand;

multiply circuitry operable to multiply said first source operand by said second source operand operable to form said result conforming to a signed number representation scheme;

shift circuitry operable to shift said result one bit left;

detection circuitry operable to determine if said shifted result is equal to a most negative signed number of said signed number representation scheme;

setting circuitry operable to form a destination operand by providing a predetermined number in response to said detection circuitry; and destination circuitry operable to hold said destination operand.

7. The data processing device of claim 6, wherein:

said setting circuitry is operable to provide said first predetermined number representative of a most positive number if said shifted result is equal to said most negative signed number; and said setting circuitry is operable to provide said shifted result to said destination circuitry if said shifted result is not equal to said most negative signed number.

8. The data processing device of claim 7, wherein said shift circuitry is operable to shift said result one bit left.

9. A method for executing a single instruction within a data processing device which multiplies a first signed source operand by a second signed source operand, normalizes a result, and saturates the result if an overflow is detected, said method comprising:

providing said first signed source operand and said second signed source operand;

multiplying said first signed source operand by said second signed source operand to form a signed result;

normalizing said signed result by shifting a predetermined number of bits according a signed number representation scheme; and forming a destination operand by setting all bits in said destination operand to a predetermined value if said shifted result incorrectly represents said normalized result according to said signed number representation scheme.

10. The method of claim 9, further comprising:

forming a status bit which indicates that said shifted result incorrectly represents said normalized result according to said signed number representation scheme.

11. The method of claim 10, wherein said step of forming a destination operand further comprises:

determining if said shifted result is equal to a most negative signed number of said signed number representation scheme; and setting said destination operand to a predetermined number in response to said detecting step when said shifted result is equal to a most negative signed number of said signed number representation scheme.

12. The method of claim 11, wherein said step of forming a destination operand further comprises:

setting all bits in said destination operand to represent a maximum positive number if said shifted result is equal to said most negative signed number; and setting all bits in said destination operand to said shifted result if said shifted result is not equal to said most negative signed number.

13. The method of claim 12, wherein said step of normalizing shifts said signed result one bit left.

14. A signal processing system, comprising:

sensor means for producing a digital signal in response to a physical input representative of a pattern;

a microprocessor having a central processing unit (CPU) and an internal program memory holding instructions for execution by said CPU to recognize the pattern;

said microprocessor further comprising:

source circuitry operable to hold a first signed source operand and a second signed source operand;

multiply circuitry operable to multiply said first source operand by said second source operand operable to form a result conforming to a signed number representation scheme;

shift circuitry operable to shift said result a predetermined number of bits;

saturation circuitry operable to form a destination operand by setting all bits in said destination operand to a predetermined value if said shifted result incorrectly represents said result according to said signed number representation scheme; and destination circuitry operable to hold said destination operand.

15. The signal processing system of claim 12 wherein said sensor means includes a microphone and an analog-to-digital converter and said program memory holds instructions for a speech recognition process.

* * * * *